United States Patent
Huang et al.

(10) Patent No.: US 12,333,468 B1
(45) Date of Patent: Jun. 17, 2025

(54) EXTENSIBLE CUSTOM CONFIGURABILITY FOR STATEFUL API RESOURCES

(71) Applicant: STRIPE, INC., San Francisco, CA (US)

(72) Inventors: Ji Huang, Bothell, WA (US); Alexander Thiemann, San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 215 days.

(21) Appl. No.: 17/495,713

(22) Filed: Oct. 6, 2021

(51) Int. Cl.
G06Q 10/0631 (2023.01)
G06F 9/451 (2018.01)
G06F 9/54 (2006.01)

(52) U.S. Cl.
CPC ....... *G06Q 10/06315* (2013.01); *G06F 9/451* (2018.02); *G06F 9/547* (2013.01)

(58) Field of Classification Search
None
See application file for complete search history.

(56) References Cited

U.S. PATENT DOCUMENTS

| | | | |
|---|---|---|---|
| 9,349,142 | B2 | 5/2016 | Tobin |
| 2011/0197177 | A1* | 8/2011 | Mony ................. G06F 8/51 717/115 |
| 2014/0052617 | A1* | 2/2014 | Chawla ............. G06Q 20/102 705/39 |
| 2014/0337161 | A1* | 11/2014 | Whisnant ........... G06Q 30/0631 705/26.7 |
| 2020/0098207 | A1 | 3/2020 | Liao |
| 2020/0201525 | A1* | 6/2020 | Chin ................. G06Q 10/0633 |

FOREIGN PATENT DOCUMENTS

EP 1269321 B1 * 6/2008 .......... G06F 11/3684

OTHER PUBLICATIONS

Carla Sadtler et al., Patterns: Implementing Self-Service in an SOA Environment, Jan. 2006, IBM International Technical Support Organization (Year: 2006).*
International Search Report and Written Opinion on the Patentability of Application No. PCT/US2022/045722 Mailed Jan. 27, 2023, 9 pages.

* cited by examiner

*Primary Examiner* — Jerry O'Connor
*Assistant Examiner* — Matthew H Divelbiss
(74) *Attorney, Agent, or Firm* — Foley & Lardner LLP

(57) ABSTRACT

The present disclosure is directed to systems and methods that provide support for customized versions of functions that operate on a resource of a commerce platform by giving customers the ability to write custom versions of such functions that employ more advanced/complex logic that what is offered by default configurations for the functions. A custom scripting language may be added to the API of the commerce platform, which may allow customers to define scripts that specify the desired custom functionality. In response to receiving a request to customize the function from a customer, a function signature specifying information about the custom version of the function may be provided to the customer. Upon receiving a script defining a custom version of the function, the script may be stored on the resource object representing the resource the custom function is to operate on.

18 Claims, 10 Drawing Sheets

```
{
    // ... other inventory fields
    notifications: {
        type: 'basic',
        basic: {
            low_stock_threshold: 100
        }
    }
}
```

```
{
  // ... other inventory fields
  notifications: {
    type: 'advanced', // or custom?
    advanced: {
      script: "function notify() { return false }" // never noti
      execute_on: update | recurring,
      recurring: {
        frequency: 3600 // frequency to run the script in second
      }
    }
  }
}
```

```
function notify(inventory, client)
{
    if(client.listInventoryTransactions(inventory.id, now() - 30m).count > 100)
        return true
}
```

450 ered herein.

EXTENSIBLE CUSTOM CONFIGURABILITY FOR STATEFUL API RESOURCES

BACKGROUND

Merchants, such as on-line retailers, brick and mortar retailers, service providers, etc., provide various products and services to consumers. One way of providing their products and services includes providing them directly to consumers through, for example, an online store associated with the merchant. That is, a consumer interested in a product sold by a merchant can visit the merchant's website, browse products, and purchase a selected product directly from the merchant. Today, many merchants use third party commerce platforms to handle all their inventory management, customer billing, and account management needs such as transaction processing, stock updating, upgrading, downgrading, or cancelling subscriptions, changing payment method details, and viewing and exporting billing history.

The merchant's commerce platform may provide a number of stateful API resources associated with the products and services of the merchant such as e.g., balance, balance transactions, charges, customers, inventory, and inventory transactions, among others. The merchant's commerce platform (whether provided by a third party or otherwise) may also offer a predefined set of possible conditions for taking an action on a stateful API resource. For example, the merchant may want to trigger a notification when inventory for a product falls below a certain threshold, or they may want to modify the state of a subscription from "past due" to "canceled" if the latest invoice is not paid for 30 days. In the former case, an inventory resource may include a predefined integer parameter such as e.g., a "low_stock_threshold" on which the triggering of a notification can be based. In the latter case, a subscription resource may include e.g., the predefined parameters "transition_after_days" and "transition_to" on which the modification of the state of the subscription can be based.

However, the usefulness of these predefined conditions is compromised when customers require a higher degree of configurability. For example, a merchant (i.e., a customer of the commerce platform) may wish to trigger different tiers of low stock notifications, or may wish to trigger notifications based on how fast (i.e., the rate at which) inventory is moving, as opposed to based solely on a threshold associated with the absolute number of items of a particular product that are left in inventory. Although the commerce platform can always add additional properties/conditions on a resource (e.g. add a "low_stock_thresholds" array that covers multiple low stock tiers), it will always be playing catch up to subsequent configurability requests.

There are numerous cases where limited configurability results in inconvenience for customers, including pro rations, subscription state, transition schedule, payment method selection, custom price transformations, discount application, and metered billing aggregation among others. Because of how prevalent the impact of limited configurability is, a generic yet extensible solution where customers can easily achieve their desired functionality through custom logic is required.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 3B is a diagram illustrating code of a custom version of a notifications function that operates on a resource object, in accordance with some embodiments of the present disclosure.

FIG. 4B is a diagram illustrating code of a custom version of a notifications function that operates a resource object, in accordance with some embodiments of the present disclosure.

DETAILED DESCRIPTION

Figure 1:
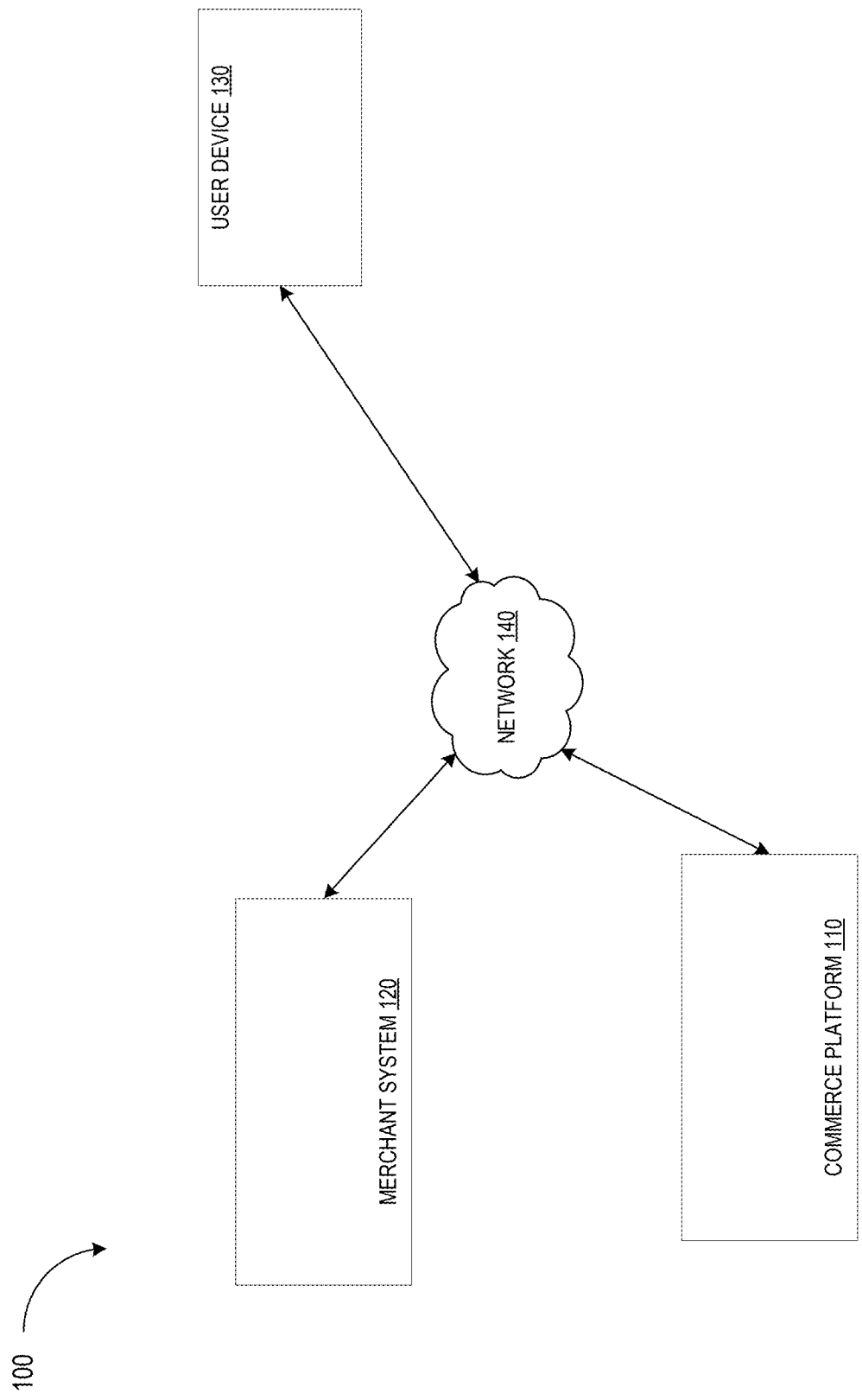
FIG. 1 is a high level block diagram of an exemplary system architecture for generating customized versions of functions that operate on resource objects of the commerce platform, in accordance with some embodiments of the present disclosure.

The present disclosure is directed to systems and methods that provide the default configurability for functions that operate on various resources of a commerce platform, while also providing support for customized versions of such functionality by giving customers the ability to customize such functionality with more advanced/complex logic than is offered by the default configurability. A custom scripting language may be added to the API of the commerce platform, which may allow customers to define scripts that specify the desired custom functionality. A script for a custom version of a function may be stored along with the default configurations of the function on the resource object representing the resource the custom function is associated with. The custom version of the function can be executed without having to change the existing API of the commerce platform to do so. The techniques discussed herein are fully extensible and can be applied on any number of functions over any number of resources of a commerce platform.

In an exemplary embodiment, a method is presented, the method comprises: providing a resource object that includes logic for performing a function associated with a resource of a commerce platform and customization logic to support a custom version of the function. In response to receiving a request to customize the function from a customer, a function signature is provided to the customer, the function signature specifying information about the custom version of the function. The information about the custom version of the function may include a return type of the custom version and a set of parameters to be specified as input arguments to the custom version of the function. The set of application program interfaces (APIs) of the commerce platform is modified with a scripting language for defining the custom version of the function. A script defining the custom version of the function may be received, the script being generated by the customer with the scripting language and based at least in part on the function signature. The script may be stored along with one or more basic configurations for the function and executed without having to change the existing API of the commerce platform to do so.

In another embodiment, a commerce platform is provided. The commerce platform may comprise a memory and a processor coupled with the memory. The processor may be configured to: provide a resource object that includes logic for performing a function associated with a resource of a commerce platform and customization logic to support a custom version of the function. In response to receiving a request to customize the function from a customer, the processor may provide a function signature to the customer, the function signature specifying information about the custom version of the function. The information about the custom version of the function may include a return type of the custom version and a set of parameters to be specified as input arguments to the custom version of the function. The set of application program interfaces (APIs) of the commerce platform may be modified with a scripting language for defining the custom version of the function. A script defining the custom version of the function may be received, the script being generated by the customer with the scripting language and based at least in part on the function signature. The processor may store the script along with one or more basic configurations for the function and may execute the script without having to change the existing API of the commerce platform to do so.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "configuring," "receiving", "generating", "transmitting", "processing", "providing", "determining", "accessing", "entering", "utilizing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a high level block diagram of an exemplary system 100 for providing customers of a commerce platform the ability to generate customized versions of functionality attached to resource objects of the commerce platform that employ more advanced/complex criteria when executing. In one embodiment, the system 100 includes a commerce platform 110, a merchant system 120, and a user device 130. In one embodiment, the user device 130 is a desktop computer system or a laptop computer system, etc., although in other embodiments user device 130 may be a mobile computing device, such as a smartphone, tablet computer, smartwatch, etc. The merchant system 120 and commerce platform 110 may also be computing devices, such as one or more server computer systems, desktop computer systems, etc.

In embodiments, there may be more than one user device, more than one commerce platform, and/or more than one merchant system, which may be used with the commerce platform facilitating transactions between the user device and the merchant system. However, to avoid obscuring the present embodiments, the below discussion refers to the commerce platform 110, merchant system 120, and user device 130.

The commerce platform 110, merchant system 120, and user device 130 may be coupled to a network 140 and communicate with one another using any of the standard protocols for the exchange of information. In one embodiment, one or more of the commerce platform 110, merchant system 120, and user device 130 may run on one Local Area Network (LAN) and may be incorporated into the same physical or logical system, or different physical or logical systems. Alternatively, the commerce platform 110, merchant system 120, and user device 130 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, merchant system 120 provides a digital marketplace which offers the sale of physical products or digital products and services (e.g., on a subscription basis), etc. which are collectively referred to herein as "products," of merchant system 120. That is, merchant system 120 is the supplier of the products and/or services consumed by user device 130. To this end, merchant system 120 may interact with commerce platform 110, which facilitates transaction processing and other functionality that may originate within merchant system 120 (e.g., providing resources that allow for customization of the functions that operate on those resources).

Figure 2A:
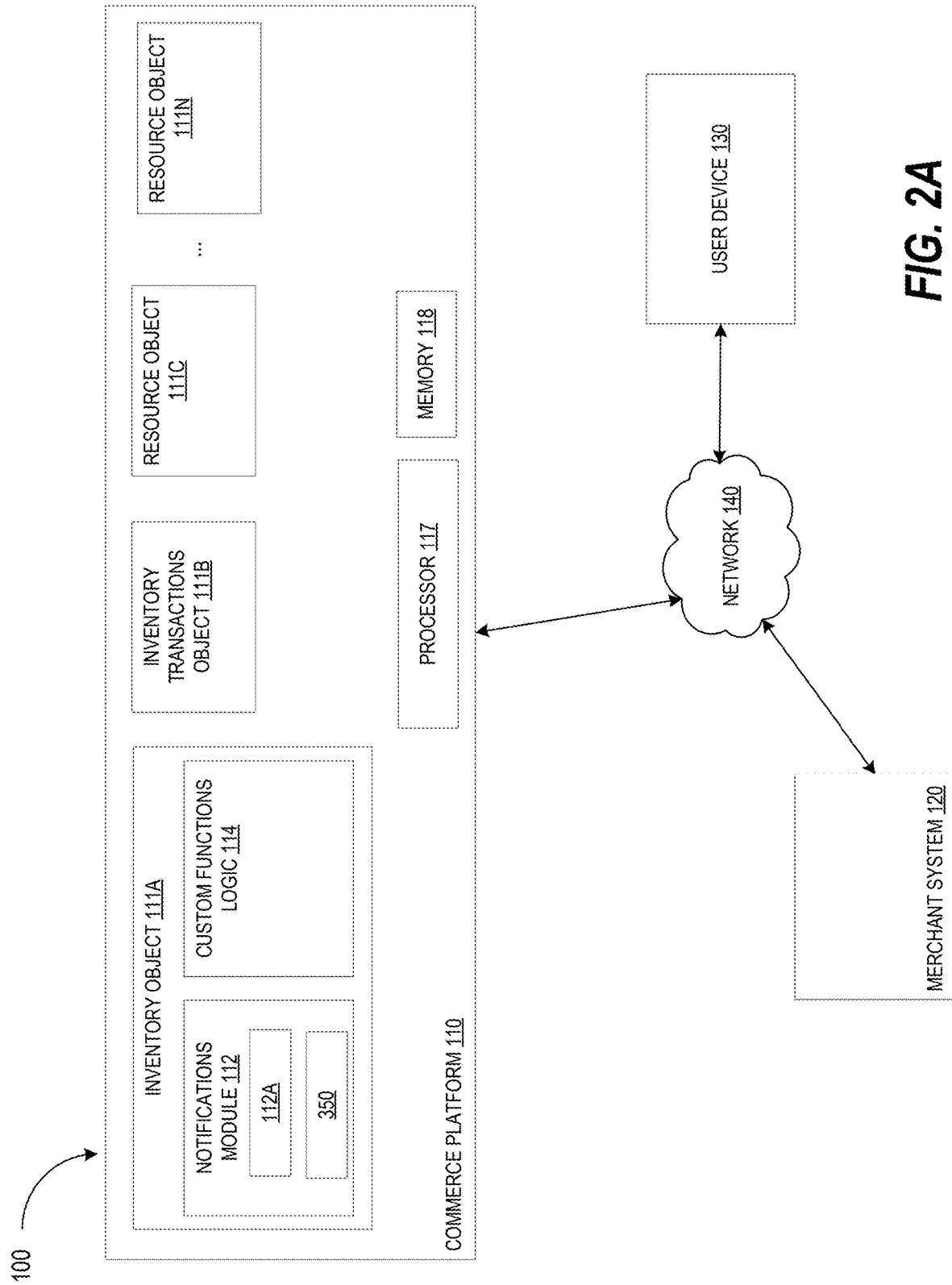
FIG. 2A is a detailed block diagram of an exemplary system architecture for generating customized versions of functions that operate on resource objects of the commerce platform, in accordance with some embodiments of the present disclosure.

FIG. 2A illustrates a detailed block diagram of the system 100 in accordance with some embodiments of the present disclosure. Each of the commerce platform 110, merchant system 120, and user device 130 may include hardware such as processor 117 (e.g., processors, central processing units (CPUs)), memory 118 (e.g., random access memory (e.g., RAM), storage devices (e.g., hard-disk drive (HDD), solid-state drive (SSD), etc.), and other hardware devices (e.g., sound card, video card, etc.)). In some embodiments, memory 118 may comprise persistent storage that is capable of storing data. Memory 118 may include software and/or logic which may be executed by processor 117 respectively in order to perform the embodiments described herein.

The functionality of the commerce platform 110 may be implemented using an application program interface (API) (not shown in the figures) that is organized around e.g., the representational state transfer (REST) architecture and may provide predictable resource-oriented uniform resource locators (URLs), accept form-encoded request bodies, return JSON-encoded responses, and use standard hypertext transfer protocol (HTTP) response codes, authentication, and verbs. The commerce platform 110 may include the processor 117, the memory 118, and resource objects 111A-11C (also referred to and shown in FIG. 2A as inventory object 111A, inventory transactions object 111B, and resource object 111C). Each resource object 111 may represent a particular resource as discussed in further detail herein. A resource object is an object with a type, associated data, relationships to other resources, and a set of functions that operate on it. Examples of resources that may be represented by resource objects may include balance, balance transactions, charges, customers, inventory, and inventory transactions, among others.

Each resource object 111 may have one or more modules (e.g., notifications module 112 shown in FIG. 2A) that each comprise logic for providing a particular function (e.g., triggering a notification) of the set of functions that operate on/are associated with that resource object 111. A resource object 111 can be modified so that a module of the resource object 111 may support a custom version of the function it provides, which may be defined by the customer via a script provided by the customer. The module may store the custom version of the function along with the default configurations for the function as discussed in further detail herein. Stated differently, configurability of functions may be implemented on the actual resource objects on which they operate. Any appropriate number of resource objects 111 may be modified in this way based e.g., on the needs of the commerce platform 110's customers (e.g., merchant system 120).

Figure 3A:
FIG. 3A is a diagram illustrating a code implementation of a default configuration for a notifications function, in accordance with some embodiments of the present disclosure.

As can be seen in FIG. 2A, inventory object 111A may include a notifications module 112 that provides functionality for triggering notifications based on any of a set of predefined default configurations. One example of a default configuration is the default configuration 112A included within notifications module 112. The default configuration 112A may include logic defining a basic condition on which a notification can be triggered. For example, the default configuration logic 112A may allow a customer to configure notifications that will trigger e.g., when the inventory stock drops below 100. FIG. 3A illustrates an example code implementation of the default configuration 112A. As can be seen in FIG. 3A, the code calls the notifications module 112 ("notifications") and indicates a basic configuration will be used ("basic"—although any other indicator such as "default" may also be used) and then invokes a predefined basic configurability parameter (e.g., "low_stock_threshold") defined by the default configuration 112A with a specific limit ("low_stock_threshold: 100") so that notifications will trigger when the inventory stock drops below 100.

The inventory object 111A may be modified with custom functions logic 114 which may allow the notifications module 112 to support not just the default configuration 112A, but custom versions of the notifications functionality that can be defined by a script provided by the customer. FIG. 3B illustrates a script 350 defining a custom version of the notifications functionality provided by the notifications module 112. As can be seen in FIG. 3B, the script 350 calls the notifications module 112 ("notifications") and indicates that a customized version of the default functionality will be used ("advanced"—although any other appropriate input may be used) and then specifies more advanced/complex criteria for when a notification should be triggered beyond that provided by the default configuration 112A. In this way, the custom functions logic 114 may allow the customer to define custom versions of any of the functions that operate on the inventory object 111A. In addition, any number of the resource objects 111 may be modified with custom functions logic similar to custom functions logic 114 that will enable a customer to customize the functions that operate on those resource objects 111.

For example, the custom functions logic 114 may allow the customer to specify any combination of events (e.g., inventory updates) and/or times (e.g., recurring intervals) for when notifications should be triggered. In the example of FIG. 3B, the customer has defined the script 350 to instruct the notifications module 112 to provide an inventory notification on a recurring basis ("recurring") every 3600 seconds ("frequency: 3600"). The notifications module 112 may also save the script 350 for future use (as shown in FIG. 2A). Although discussed with respect to notifications functionality for example purposes, embodiments of the present disclosure may apply to any appropriate functionality or combination of functionalities that operate on any of a number of resource objects 111.

The API of the commerce platform 110 may be modified with a common scripting language that can be used by a customer to define their scripts. The common scripting language may be any appropriate language that is easily understood across various different resource objects/functions, has a consistent syntax across various different resource objects/functions, and must not require significant domain knowledge per function. For example, if the customer is able to access a price object for one function using a particular script, they should be able to use the same script to access the price object for another function. In some embodiments, the common scripting language may be similar to Javascript (or may be based on/contain elements of Javascript), which is easily understandable, and has a consistent syntax across resource objects (e.g., consistent syntax between processing inventory or price). In this way, the customer only needs to understand the differences between various resources of the commerce platform 110 including what functions and information/data various resources objects 111 have on them. For example, the inventory object 111A may have certain properties/data that can be accessed and used to define criteria for triggering a notification. If the customer wants to access information from other resource objects 111 to define further criteria to trigger notifications based e.g., on the location of a customer, they only need to understand that resource object 111C is a customer object that includes data about customers including location, age, payment information etc.

Each script is specific to a resource that the customer wishes to act on and specific to a functionality they wish to customize. More specifically, a script may specify the containing resource object that the customer wishes to access (e.g. if the customer is deciding how to aggregate metered billing usage records, they may wish to access a subscription resource object, or if they are deciding criteria for whether/when to trigger an inventory notification, they may wish to access a current state of the inventory object 111A). As discussed herein, a resource object 111 may have a number of functions (and a corresponding module for each) that operate on it and the script may further specify one of these functions (e.g., the notification functionality—provided by module 112) to be customized. The script may also define a subset of the commerce platform 110's APIs (referred to herein as a "limited client") to which the custom version of the function will have access. The limited client (not shown in the figures) may be in the form of a read only software development kit (SDK) so that the script can call one or more of its APIs to make read only requests to other resource objects 111 (and the data/functionality associated therewith) of the commerce platform 110 beyond the containing resource object specified in the script. In this way, a customer is not limited to the data/functionality provided by the containing resource object they are working with when defining a custom version of a function, but have access to the full set (or a limited subset if the customer specifies only a subset) of resource objects 111 (and their data/functionality) that exist on the commerce platform 110.

When the customer initially defines the limited client (i.e., the APIs that their script will have access to), it may include a limited number of APIs/resources which the script can access, (e.g. only allow reading from certain resource objects). As the customer gains a better understanding of the problems they are trying to solve and the functionality they need, they may progressively add more of the commerce platform 110's APIs to the limited client as necessary.

Figure 2B:
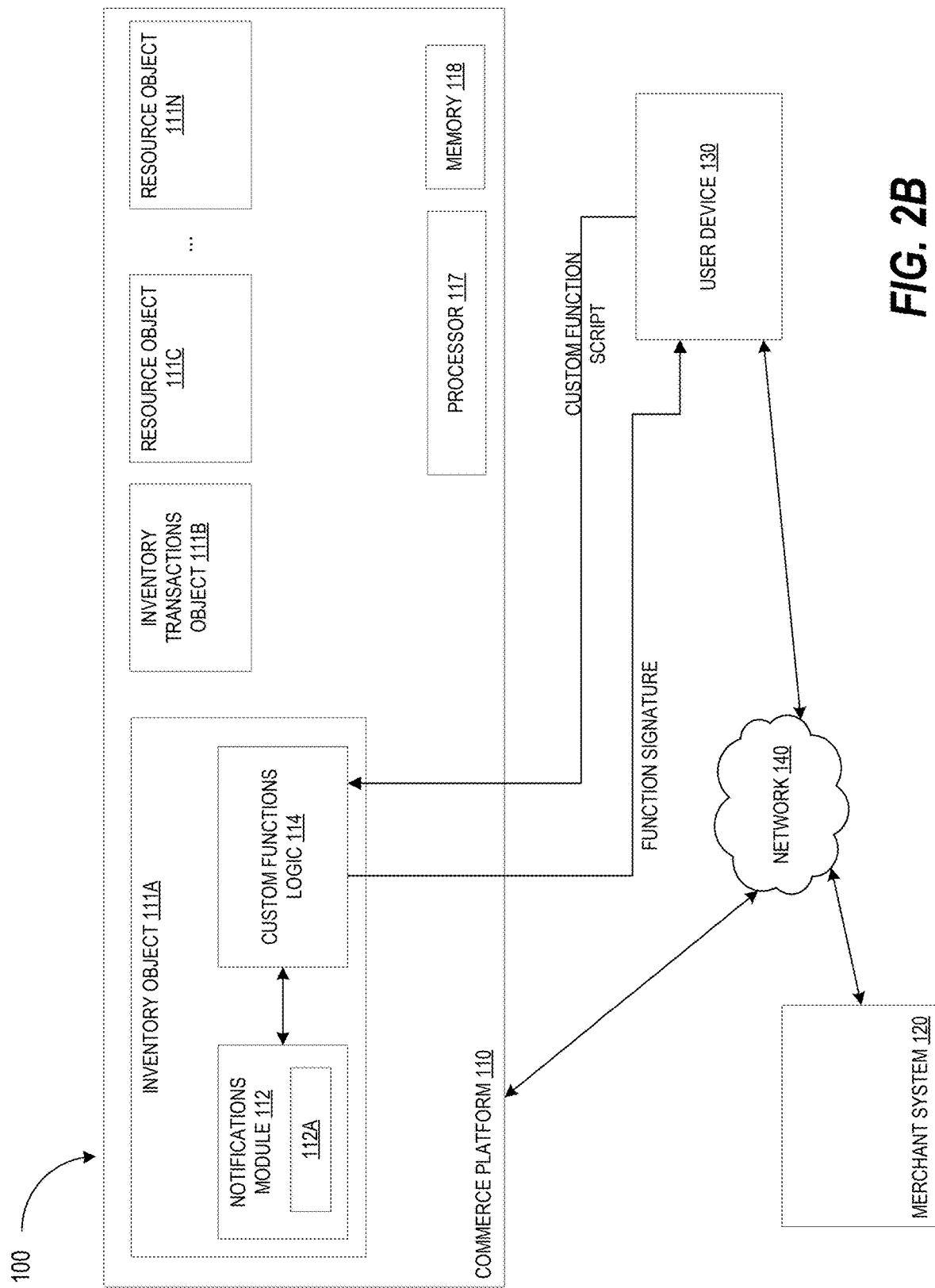
FIG. 2B is a detailed block diagram of an exemplary system architecture for generating customized versions of functions that operate on resource objects of the commerce platform, in accordance with some embodiments of the present disclosure.

Referring also to FIG. 2B, much of the basic configurability on the commerce platform 110's API may be static, only allowing for use of predefined basic configurations (e.g., default configuration 112A) with respect to the functions that operate on a resource object 111 (e.g., inventory object 111A). The custom functions logic 114 may modify the notifications module 112 so that for aspects of the notifications functionality where a customer can specify a basic configuration, they can instead provide a script defining a custom function. In response to a customer indicating that they wish to provide a script defining a custom version of the function, the custom functions logic 114 may provide the customer with a function signature, which may specify information about custom version of the function including parameters that the customer must specify values for, which will act as input arguments in their script.

Examples of such parameters include the resource object containing the function they wish to customize, the particular function they wish to customize, the limited client (subset of the commerce platform 110's APIs that the script will have access to), and a set of primitive parameters (e.g. integers, booleans). The set of primitive parameters may provide additional information that might be useful for business logic in the script, but is not strictly part of any resource. For example, in the inventory notification case, the signature might include an integer parameter for how many times a notification might have already been triggered. In another example, if a script execution is happening based on a customer request where the customer passed in certain parameters that were not linked to any resource of the commerce platform 110, such parameters can be passed in to the script via these primitive parameters. The information about custom version of the function may also specify values for certain parameters that the script must comply with such as a return type (e.g. boolean, integer, etc.) of the custom version of the function. In the example of FIG. 3B, the function signature would specify the return type of the notifications functionality provided by module 112 as a Boolean. The customer may define their script based on the information specified in the function signature.

Upon receiving a script defining a custom version of e.g., the notifications functionality of module 112, the custom functions logic 114 may store the script within the notification module 112 along with the default configurations for the function (e.g., default configuration 112A). The customer may execute their custom version by calling the notifications module 112 and invoking their custom function instead of a default configuration (e.g., default configuration 112A).

The custom functions logic 114 may also specify and enforce an upper limit/threshold on the execution time of a custom function. For example, the custom functions logic 114 may specify that a custom function must finish executing within a certain time period (e.g., 5 seconds) or execution will be cancelled. Indeed, execution of a custom function is essentially an API call (which could have multiple API calls in it as discussed hereinabove) that may be thought of as a "sandbox" that causes resource constraints on the commerce platform 110. By setting an upper limit on the execution time of a custom function, the strain on the computing resources of the commerce platform 110 is mitigated because the execution time threshold limits the number of "sandboxes" that are executing simultaneously as well as their lifetimes. Implementing such an upper limit on the execution time of a custom function also results in a better user experience by reducing the latency on operations performed by the customer. In addition, if the custom function involves a loop that is running over an extended period of time, this can make it difficult for the customer to debug their code and some bugs in the code can even result in a loop simply running indefinitely.

Figure 4A:
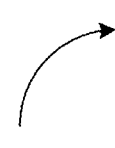
FIG. 4A is a diagram illustrating code of a custom version of a notifications function that operates a resource object, in accordance with some embodiments of the present disclosure.

FIG. 4A, illustrates a script 400 defining a custom version of the notifications functionality of module 112 that triggers a notification when inventory stock dips below 5. As can be seen, the first line of the script 400 states "function notify (inventory, client)" which indicates the inventory object 111A ("inventory") as the resource object the customer wishes to access, indicates the notifications functionality of module 112 ("notify") as the functionality they wish to customize, and in this example the limited client ("client") as well. Script 400 also specifies the return type as a Boolean ("true"). The customer may define the script 400 based on a function signature provided by the module 112 as discussed in further detail herein. It should be noted that in the example of FIG. 4A, although the limited client is invoked, there is no need to call to any data or functionality beyond what the inventory object 111A provides (even though the script 400 has the capability since the limited client is called). Indeed, "inventory.orderable.quantity" may be a predefined basic configurability parameter provided by a default configuration that exists on the notifications module 112, so the customer only needs to specify that they want to trigger a notification when the inventory dips below 5 ("inventory.orderable.quantity<5").

However, invoking basic configurability via a custom function script allows for further customization of the basic configurability. Indeed, much of the configurability on the commerce platform 110's API may be static, only allowing for use of predefined basic configurability parameters on a stand-alone basis. But by defining such basic configurability as part of a script instead of a static configuration, a higher degree of customizability may be achieved. For example, the script 400 can be further modified to define criteria indicating that a notification is to be triggered if the inventory drops at a rate that is higher than a threshold (e.g., where a customer wants to be notified if there is e.g., a flash sale). In another example, the script 400 can be further modified to trigger a notification if the inventory stock drops below 5 from Monday-Wednesday each week, but only trigger a notification if the inventory stock drops below 100 from Thursday to Sunday each week.

In this way, a customer can define more complex functionality without the commerce platform 110 having to change its API to do so. The limited client (subset of commerce platform 110's APIs) allows a script to not only utilize dates and other information/functionality that is part of the resource object at hand (inventory object 111A), but information from other resource objects 111 as well as functionality associated with those other resource objects 111. For example, the resource object 111C may represent a customer resource and may indicate a plethora of information about customers including their location. Thus, the script 400 can be modified to trigger a notification when the inventory stock is below 5, and a customer making a purchase is located in Germany by accessing the resource object 111C (via a corresponding API of the resource object 111C that is part of the limited client) to obtain the purchasing customer's location information. When a script includes the limited client, the limited client may be considered as an SDK that is injected into the code of the script that allows the script to access other resources of the commerce platform 110. It should be noted that when accessing data/functionality from other resource objects, any required authentication for use of the commerce platform 110's resources has already been carried out and the script is already acting on behalf of the customer.

FIG. 4B illustrates a script 450 that triggers a notification if the number of inventory transactions (i.e. consumption of inventory) is over 100 within the past 30 minutes. Because viewing inventory transactions is not a default function of the inventory object 111A, this functionality must be obtained from another part of the commerce platform 110. Thus, the inclusion of the limited client in the script 450 allows the script 450 to specify the resource object it wants to pull information from, which in this example is the inventory transactions object 111B. The script 450 may utilize the limited client to access a list of inventory transactions in the inventory transactions object 111B ("client.listinventorytransactions") and identify inventory transactions over the past 30 minutes that correspond to the inventory object 111A ("(inventory.id, now( )-30 m") and subsequently specify a threshold for a notification (".count>100").

Although in some embodiments the limited client may provide a script access to various resources of the commerce platform 110 as well as resources outside of the commerce platform 110, in other embodiments, such access is limited to the various resources of the commerce platform 110 and does not extend to resources outside of the commerce platform 110 (e.g., those that are provided by third parties and accessible via the internet). This is because while embodiments of the present disclosure provide techniques for customers to customize functionality based on a variety of information/resources, it may not be feasible to provide unlimited access to an unlimited universe of information/resources. For example, the latency that would be generated by accessing resources of a third party management service via network 140 would significantly hinder the operation of the commerce platform 110.

Figure 5:
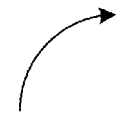
FIG. 5 is a diagram illustrating code of a custom version of an aggregator function that operates on a subscription resource object, in accordance with some embodiments of the present disclosure.

FIG. 5 illustrates a script 500 for metered billing aggregation where the return value is an integer (e.g., the value of the aggregated bills). Although there may be many different ways in which a customer wants to aggregate their metered billing, the script 500 may be defined to return the sum of the events. The script 500 may specify a subscription resource object ("subscription_item"), specify the summation functionality ("aggregator") as the functionality of the subscription resource object to be customized, and invoke a limited client ("client"). Because reading usage events is not default functionality of the subscription resource object, the script 500 may use the limited client to read a usage events object ("client.readUsageEvents") and specify that it is looking for usage events of the subscription resource object that have occurred so far starting from the start time of the current subscription period to the end of the current subscription period ("(subscription_item, subscription.current_period_start, subscription.current_period_end)"). The script 500 then specifies logic for summing the events ("for(var i=0, i<events.length, i++)") and returns the summed total ("return total;"). Thus, if the customer sent 100 text messages at one cent each, each text message is an event and the aggregated sum amounts to one dollar.

As discussed hereinabove, the custom functions logic 114 may preempt execution of runaway scripts by limiting the amount of time the script will execute with a threshold execution time, and cancelling execution if the execution time exceeds the threshold execution time. The custom functions logic 114 may also observe how often a custom script times out and if it is above a threshold, may blacklist the custom script if it consistently times out. In some embodiments, the custom functions logic 114 may limit the number of reads/queries the script can make (e.g., allow only 3 point reads or 1 list call) so as to prevent cancellation of functions that exceed the threshold execution time because they involve large amounts of complex logic.

The custom functions logic 114 may also let customers configure what happens on a failed script execution—e.g. if the script reads a non-existent resource object and fails. The custom functions logic 114 may also provide a number of default fallback options (such as e.g., an option to do nothing/take no action), or send a web hook notification on failure of the script so that the customer can handle/troubleshoot the issue on their end. In some embodiments, the custom functions logic 114 may perform all of the above in response to the script failing based on customer preference.

Customers also need a way to debug the code of their custom function scripts when they run into errors. In the example where the script reads a non-existent resource object, the customer may not know what is causing the resource object to not be there, but could normally use execution logs that are generated as a result of executing their custom function to assist with debugging their script. However, because the code of their script is running on the commerce platform 110, customers may not have an immediate way to access the execution logs. Custom functions logic 114 may provide the customer with the ability to access the execution logs of their custom functions and thereby review the code of their script and debug it as necessary. In some embodiments, the custom functions logic 114 may save e.g., 3 loglines per script to be saved to a script execution object which can be accessed by the customer.

Because some customers may be more visual and less familiar with scripting functions using code, the custom functions logic 114 may break the scripting language into composable blocks, and provide an intuitive user interface (UI) for the customer to construct their custom logic in a manner similar to the coding blocks that novice coders utilize when they first start coding. By abstracting the various functionalities of the scripting language into blocks (or any other appropriate shapes), customers that are not as comfortable with code can simply define their custom function by constructing a flow chart with blocks that represent various functions (e.g., if statements and other conditions that are language mapped to the blocks).

Figure 6:
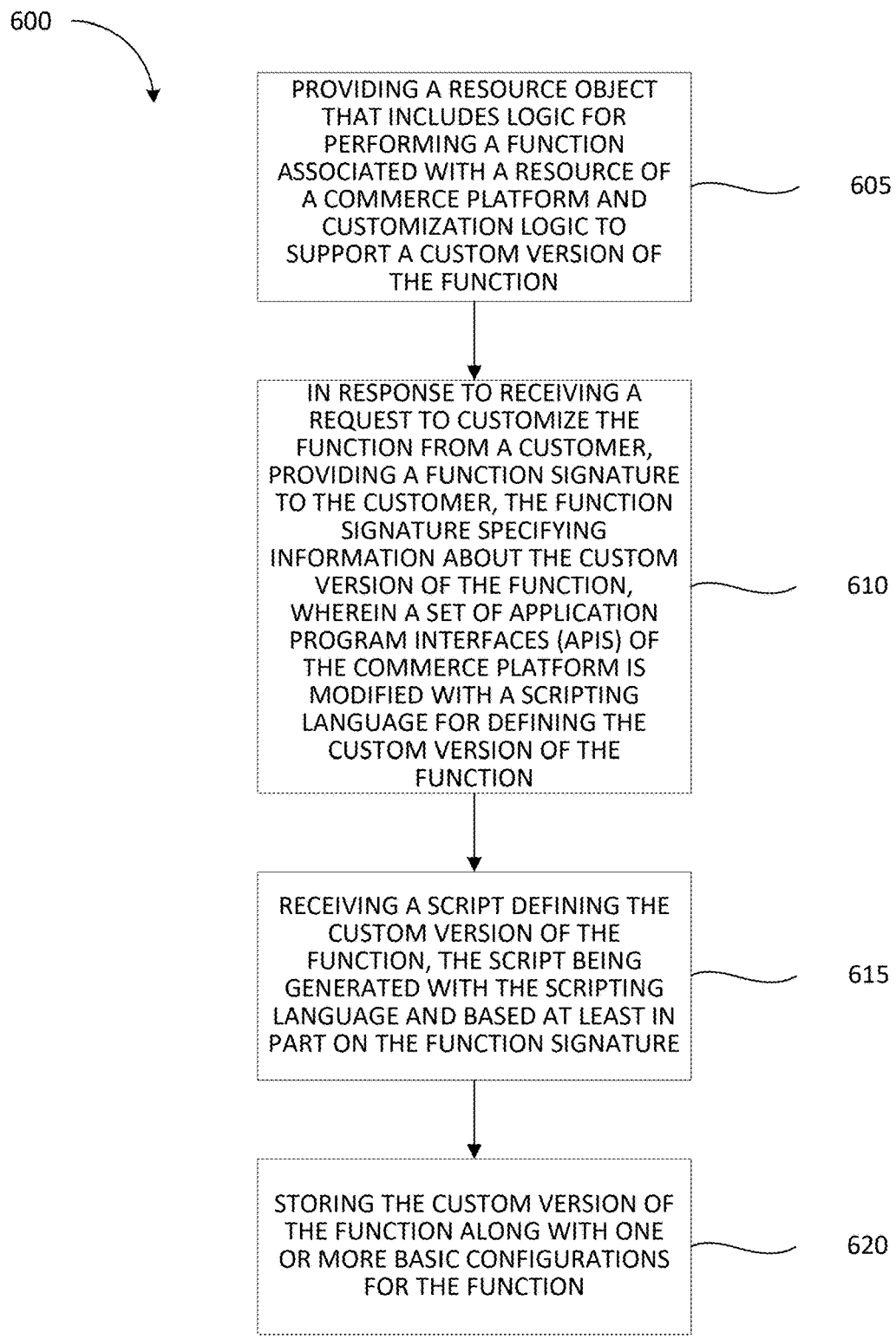
FIG. 6 is a flow diagram of a method for generating customized versions of a function that operates on a resource object of the commerce platform, in accordance with some embodiments of the present disclosure.

FIG. 6 is a flow diagram of one embodiment of a method 600 for providing resource objects that allow customers to customize the functionality of resource objects, in accordance with some embodiments of the present disclosure. The method 600 may be performed by processing logic that may comprise hardware (circuitry, dedicated logic, etc.), software (such as is run on a general purpose computer system or a dedicated machine), firmware, or a combination thereof. In one embodiment, the method 600 may be performed by e.g., processor 117 of commerce platform 110 as illustrated in FIGS. 2A and 2B.

Referring simultaneously to FIGS. 2A and 2B, at block 605 the processor 117 may provide a resource object that includes logic for performing a function associated with a resource of a commerce platform and customization logic to support a custom version of the function. More specifically, inventory object 111A may include a notifications module 112 that provides functionality for triggering notifications based on any of a set of predefined default configurations. One example of a default configuration is the default configuration 112A included within notifications module 112. The default configuration 112A may include logic defining a basic condition on which a notification can be triggered. For example, the default configuration 112A may allow a customer to configure notifications that will trigger e.g., when the inventory stock drops below 100. FIG. 3A illustrates an example code implementation of the default configuration 112A. As can be seen in FIG. 3A, the code calls the notifications module 112 ("notifications") and indicates a basic configuration will be used ("basic"—although any other indicator such as "default" may also be used) and then invokes a predefined basic configurability parameter (e.g., "low_stock_threshold") defined by the default configuration 112A with a specific limit ("low_stock_threshold: 100") so that notifications will trigger when the inventory stock drops below 100.

The inventory object 111A may be modified with custom functions logic 114 which may allow the notifications module 112 to support not just the default configuration 112A, but custom versions of the notifications functionality that can be defined by a script provided by the customer. FIG. 3B illustrates a script 350 defining a custom version of the notifications functionality provided by the notifications module 112. As can be seen in FIG. 3B, the script 350 calls the notifications module 112 ("notifications") and indicates that a customized version of the default functionality will be used ("advanced"—although any other appropriate input may be used) and then specifies more advanced/complex criteria for when a notification should be triggered beyond that provided by the default configuration 112A. In this way, the custom functions logic 114 may allow the customer to define custom versions of any of the functions that operate on the inventory object 111A. In addition, any number of the resource objects 111 may be modified with custom functions logic similar to custom functions logic 114 that will enable a customer to customize the functions that operate on those resource objects 111.

For example, the custom functions logic 114 may allow the customer to specify any combination of events (e.g., inventory updates) and/or times (e.g., recurring intervals) for when notifications should be triggered. In the example of FIG. 3B, the customer has defined the script 350 to instruct the notifications module 112 to provide an inventory notification on a recurring basis ("recurring") every 3600 seconds ("frequency: 3600"). The notifications module 112 may also save the script 350 for future use (as shown in FIG. 2A). Although discussed with respect to notifications functionality for example purposes, embodiments of the present disclosure may apply to any appropriate functionality or combination of functionalities that operate on any of a number of resource objects 111.

Each script is specific to a resource that the customer wishes to act on and specific to a functionality they wish to customize. More specifically, a script may specify the containing resource object that the customer wishes to access (e.g. if the customer is deciding how to aggregate metered billing usage records, they may wish to access a subscription resource object, or if they are deciding criteria for whether/when to trigger an inventory notification, they may wish to access a current state of the inventory object 111A). As discussed herein, a resource object 111 may have a number of functions (and a corresponding module for each) that operate on it and the script may further specify one of these functions (e.g., the notification functionality—provided by module 112) to be customized.

The script may also define a subset of the commerce platform 110's APIs (referred to herein as a "limited client") to which the custom version of the function will have access. The limited client (not shown in the figures) may be in the form of a read only software development kit (SDK) so that the script can call one or more of its APIs to make read only requests to other resource objects 111 (and the data/functionality associated therewith) of the commerce platform 110 beyond the containing resource object specified in the script. In this way, a customer is not limited to the data/functionality provided by the containing resource object they are working with when defining a custom version of a function, but have access to the full set (or a limited subset if the customer specifies only a subset) of resource objects 111 (and their data/functionality) that exist on the commerce platform 110.

When the customer initially defines the limited client (i.e., the APIs that their script will have access to), it may include a limited number of APIs/resources which the script can access, (e.g. only allow reading from certain resource objects). As the customer gains a better understanding of the problems they are trying to solve and the functionality they need, they may progressively add more of the commerce platform 110's APIs to the limited client as necessary.

Referring also to FIG. 2B, much of the basic configurability on the commerce platform 110's API may be static, only allowing for use of predefined basic configurations (e.g., default configuration 112A) with respect to the functions that operate on a resource object 111 (e.g., inventory object 111A). The custom functions logic 114 may modify the notifications module 112 so that for aspects of the notifications functionality where a customer can specify a basic configuration, they can instead provide a script defining a custom function.

At block 610, in response to receiving a request to customize the function from a customer, the processing device 117 may provide a function signature to the customer, the function signature specifying information about the custom version of the function, wherein a set of application program interfaces (APIs) of the commerce platform is modified with a scripting language for defining the custom version of the function. More specifically, the processor 117 (via the custom functions logic 114) may provide the customer with a function signature, which may specify information about custom version of the function including parameters that the customer must specify values for, which will act as input arguments in their script. Examples of such parameters include the resource object containing the function they wish to customize, the particular function they wish to customize, the limited client (subset of the commerce platform 110's APIs that the script will have access to), and a set of primitive parameters (e.g. integers, booleans). The information about custom version of the function may also specify values for certain parameters that the script must comply with such as a return type (e.g. boolean, integer, etc.) of the custom version of the function. In the example of FIG. 3B, the function signature would specify the return type of the notifications functionality provided by module 112 as a Boolean. The customer may define their script based on the information specified in the function signature.

At block 615, the processing device 117 may receive a script defining the custom version of the function, the script being generated with the scripting language and based at least in part on the function signature. At block 620, upon receiving a script defining a custom version of the function, the processing device 117 (via the custom functions logic 114) may store the script within the notification module 112 along with the basic configurations for the function (e.g., default configuration 112A) and may execute it whenever it is called by the customer as discussed above.

Figure 7:
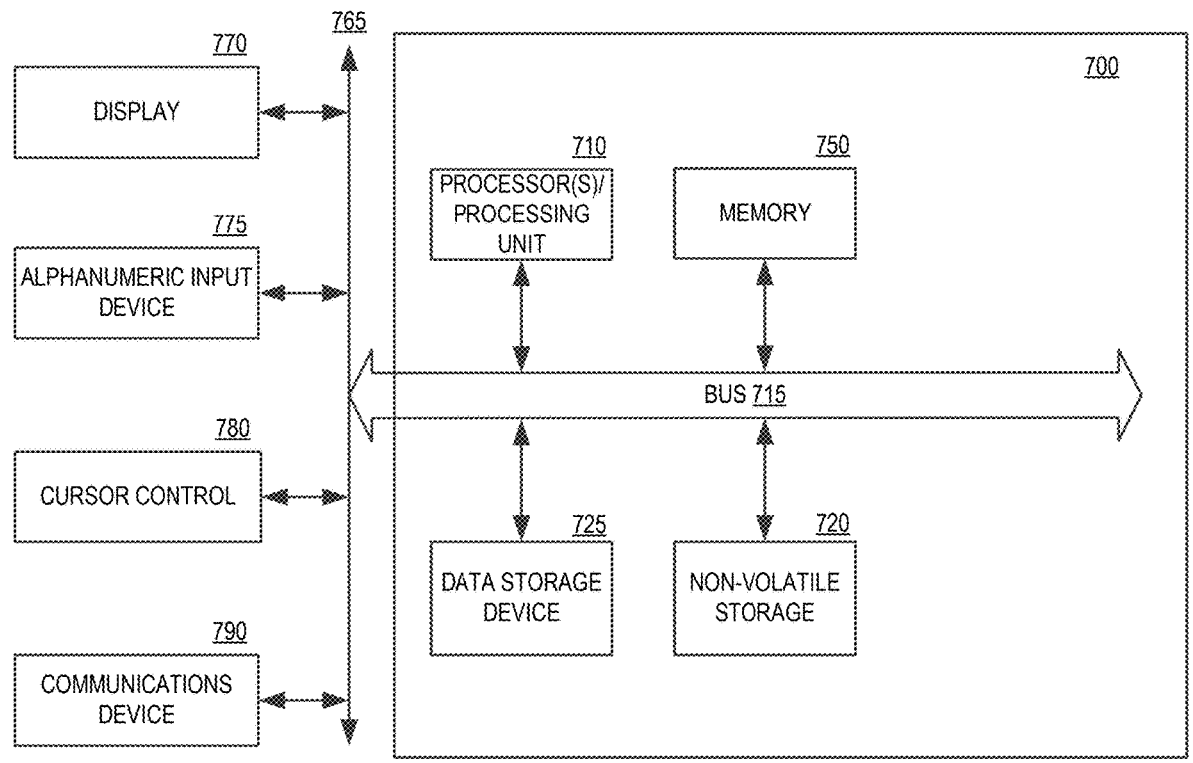
FIG. 7 is a block diagram of a computing device which may perform the methods and techniques for generating a customized version of a function that operates on a resource object of the commerce platform, in accordance with some embodiments of the present disclosure.

FIG. 7 is one embodiment of a computer system that may be used to support the systems and operations discussed herein. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. For example, the handheld device may be configured to contain only the bus 715, the processor 710, and memory 750 and/or

725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for facilitating customized functions and debugging of the customized functions via script execution objects as a controlled interface through which a platform shares selective execution data related to a custom function's execution, the method comprising:
   providing, by a server associated with a commerce platform to a merchant server, access to a first resource object that includes logic for performing a function associated with a resource of the commerce platform and customization logic to support a custom function version;
   in response to receiving, from a customer device associated with the merchant server, a request to customize the function, providing, by the server to the customer device, a function signature specifying a return value and input arguments available for the custom function version, the input arguments being parameters associated with a subset of a set of application program interfaces (APIs) of the commerce platform;
   in response to providing the function signature to the customer device, receiving, by the server from the customer device, a script (i) generated based on the function signature and (ii) defining the custom function version that requires access to a second resource object of the commerce platform, the second resource object not being accessible via the function;
   in response to receiving the script, providing, by the server to the custom function version, read-only access to the second resource object of the commerce platform; and
   in response to executing the custom function version, storing, by the server, (i) execution loglines corresponding to execution of the custom function version to an execution log that is not accessible to the merchant server and (ii) a subset of the execution loglines to a script execution object that is accessible to the merchant server while the execution log remains inaccessible to the merchant server to enable debugging of the custom function version.

2. The method of claim 1, wherein the resource is represented by the first resource object and the first resource object is one of a plurality of resource objects that each represent a particular resource of the commerce platform and comprise functions and data associated with the particular resource of the commerce platform.

3. The method of claim 2, wherein the function signature includes information about the custom function version including:
   a return type of the custom function version; and
   a set of parameters to be specified by the custom function version including:
      an indication of the first resource object;
      the subset of the set of APIs of the commerce platform which the custom function version utilizes to access other resource objects of the plurality of resource objects and any functionality and data associated with the other resource objects; and
      a set of primitive parameters of the custom function version.

4. The method of claim 3, further comprising:
   executing, by the server, the custom function version, wherein executing the custom function version does not change the set of APIs of the commerce platform.

5. The method of claim 4, further comprising:
   in response to determining that the custom function version has been executing longer than an execution time limit, stopping, by the server, execution of the custom function version; and
   in response to determining that execution of the custom function version has exceeded the execution time limit more than a threshold number of times, preventing, by the server, the custom function version from executing and presenting for display an indication on the customer device that the custom function version has been blacklisted.

6. The method of claim 1, further comprising:
   providing, by the server, a user interface that abstracts each of a set of functions of a scripting language of the script into a graphical shape, and wherein the script comprises one or more graphical shapes logically organized to define the custom function version.

7. The method of claim 1, wherein the function signature comprises a return type.

8. The method of claim 1, wherein the script further defines the custom function version to access a second resource provided by the second resource object that performs a second function to access the second resource of the commerce platform, the second function defined by the script as providing the second resource as an input to the custom function version, and the second resource object being independent of the first resource object.

9. A commerce platform comprising:
a memory; and
a processor coupled with the memory, the processor configured to:
provide, to a merchant system, access to a first resource object that includes logic for performing a function associated with a resource of the commerce platform and customization logic to support a custom function version;
in response to receiving, from a customer device associated with the merchant system, a request to customize the function, provide to the customer device a function signature specifying a return value and input arguments available for the custom function version, the input arguments being parameters associated with a subset of a set of application program interfaces (APIs) of the commerce platform;
in response to providing the function signature to the customer device, receive, from the customer device, a script (i) generated based on the function signature and (ii) defining the custom function version that requires access to a second resource object of the commerce platform, the second resource object not being accessible via the function;
in response to receiving the script, provide, to the custom function version, read-only access to the second resource object of the commerce platform; and
in response to executing the custom function version, storing (i) execution loglines corresponding to execution of the custom function version to an execution log that is not accessible to the merchant system and (ii) a subset of the execution loglines to a script execution object that is accessible to the merchant system while the execution log remains inaccessible to the merchant system to enable debugging of the custom function version.

10. The commerce platform of claim 9, wherein the resource is represented by the first resource object and the first resource object is one of a plurality of resource objects that each represent a particular resource of the commerce platform and comprise functions and data associated with the particular resource of the commerce platform.

11. The commerce platform of claim 10, wherein the function signature includes information about the custom function version including:
a return type of the custom function version; and
a set of parameters to be specified by the custom function version including:
an indication of the first resource object;
the subset of the set of APIs of the commerce platform which the custom function version utilizes to access other resource objects of the plurality of resource objects and any functionality and data associated with the other resource objects; and
a set of primitive parameters of the custom function version.

12. The commerce platform of claim 11, wherein the processor is further configured to:
execute the custom function version, wherein executing the custom function version does not change the set of APIs of the commerce platform.

13. The commerce platform of claim 12, wherein the processor is further configured to:

in response to determining that the custom function version has been executing longer than an execution time limit, stop execution of the custom function version; and
in response to determining that execution of the custom function version has exceeded the execution time limit more than a threshold number of times, prevent the custom function version from executing and presenting for display an indication on the customer device that the custom function version has been blacklisted.

14. A non-transitory computer-readable medium having instructions stored thereon which, when executed by a processor, cause the processor to:
provide, to a merchant system, access to a first resource object that includes logic for performing a function associated with a resource of a commerce platform and customization logic to support a custom function version;
in response to receiving, from a customer device associated with the merchant system, a request to customize the function, provide to the customer device a function signature specifying a return value and input arguments available for the custom function version, the input arguments being parameters associated with to a subset of a set of application program interfaces (APIs) of the commerce platform;
in response to providing the function signature to the customer device, receive, from the customer device, a script (i) generated based on the function signature and (ii) defining the custom function version that requires access to a second resource object of the commerce platform, the second resource object not being accessible via the function;
in response to receiving the script, provide, to the custom function version, read-only access to the second resource object of the commerce platform; and
in response to executing the custom function version, storing (i) execution loglines corresponding to execution of the custom function version to an execution log that is not accessible to the merchant system and (ii) a subset of the execution loglines to a script execution object that is accessible to the merchant system while the execution log remains inaccessible to the merchant system to enable debugging of the custom function version.

15. The non-transitory computer-readable medium of claim 14, wherein the resource is represented by the first resource object and the first resource object is one of a plurality of resource objects that each represent a particular resource of the commerce platform and comprise functions and data associated with the particular resource of the commerce platform.

16. The non-transitory computer-readable medium of claim 15, wherein the function signature includes information about the custom function version including:
a return type of the custom function version; and
a set of parameters to be specified by the custom function version including:
an indication of the first resource object;
the subset of the set of APIs of the commerce platform which the custom function version utilizes to access other resource objects of the plurality of resource objects and any functionality and data associated with the other resource objects; and
a set of primitive parameters of the custom function version.

17. The non-transitory computer-readable medium of claim 16, wherein the processor is further configured to:
   execute the custom function version, wherein executing the custom function version does not change the set of APIs of the commerce platform.

18. The non-transitory computer-readable medium of claim 17, wherein the processor is further configured to:
   in response to determining that the custom function version has been executing longer than an execution time limit, stop execution of the custom function version; and
   in response to determining that execution of the custom function version has exceeded the execution time limit more than a threshold number of times, prevent the custom function version from executing and presenting for display an indication on the customer device that the custom function version has been blacklisted.

* * * * *